No. 743,273. PATENTED NOV. 3, 1903.
H. HALSEY.
ELECTRIC BATTERY.
APPLICATION FILED JAN. 10, 1903.
NO MODEL.
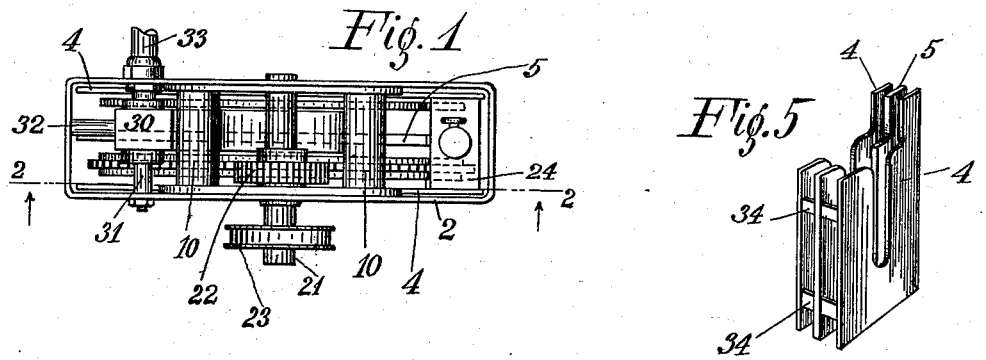
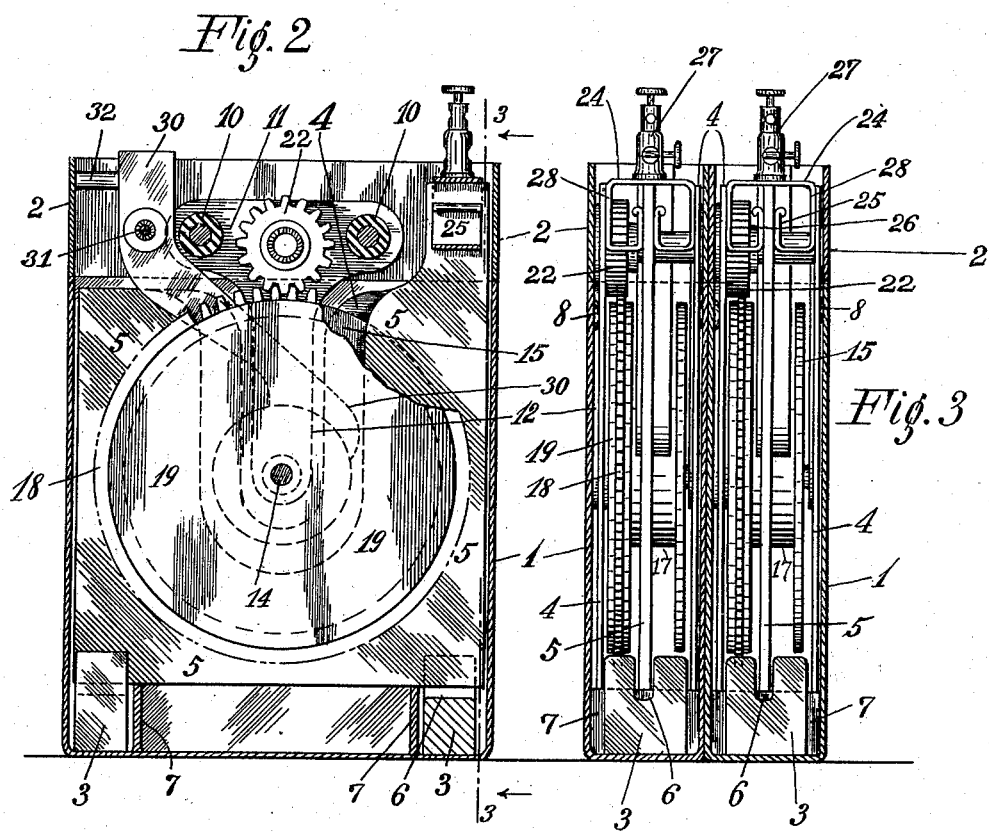
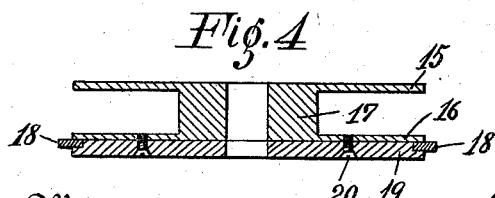
Witnesses
George N. Kin
Anthony J. Ernest
Henry Halsey Inventor
By his Attorney C. V. Edwards No. 743,273. Patented November 3, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 743,273, dated November 3, 1903.

Application filed January 10, 1903. Serial No. 138,447. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to improvements in electric batteries, and more particularly to a battery adapted for surgical use in cauterization.

Heretofore primary batteries have not been adapted for this purpose, because they were not easily regulated and portable and their output could not be regulated to the extent necessary to meet the requirements. In some instances practitioners have been unable to perform operations requiring cauterization, because electric current could not be economically procured for the comparatively short times required.

It has been my object to devise a battery especially adapted for this use and at the same time to be relatively light, simple in construction, and portable. This battery relates to the type in which there is a movable element, which, with its driving-gear, is readily removable from the solution when the battery is not in use. I have devised an improved driving-gear for the movable element, besides improvements in the devices for collecting the current from the elements, all tending to increased efficiency and compactness.

Figure 1 is a top plan view. Fig. 2 is a section on the line 2 2 of Fig. 1. Fig. 3 is a section on the line 3 3 of Fig. 2. Fig. 4 is a section of the movable element. Fig. 5 is a view of the fixed element, showing the plates attached.

1 is the casing, which may be of any shape desired, but which I have shown as rectangular, so as to be easily packed and stored.

2 is the upper portion or top of the casing, which rests on the lower portion and carries the movable element and its driving-gear.

4 4 5 are the fixed elements, which rest in spacing-slots 6 in the blocks 3.

7 represents lugs on the casing, on which the plates 4 4 5 rest.

The casing is provided with suitable projections 8 for spacing the outside plates 4 from the sides of the casing, so as to give the liquid free access to both sides. The plates are centrally cut away, as shown, so that the bushing 17 of the movable element will not contact with the relatively fixed plates.

Attached to the casing-top 2 are two bushings 10, between which and the casing are rigidly attached hangers 11, having the depending portions 12.

14 is a shaft, of suitable non-corrosive material, on which the movable element is mounted. This element may be composed of artificial graphite and comprises disks 15 16, carried on the sleeve or bushing 17, the disks being integral with the bushing.

18 is a gear-ring, which is clamped against the disk 16 by the shouldered disk 19 through the screws 20, of non-corrosive material. The gear-ring 18 is composed of hard rubber or other non-corrosive material.

21 is a hollow shaft carried in bearings in the top of the casing and having the gear-wheel 22, which meshes with the teeth on the gear-ring 18. The shaft 21 may be driven in any convenient manner by means of the pulley 23. In some cases a spring-motor may be used, so that I do not wish to be limited to any particular form of driving mechanism.

I have devised a contact device for connecting the elements 4 4 and 5, which comprises a bridge portion 24, carrying the binding-post 27, side portions 28 28, which contact with the outside elements 4, and the spring-jaws 25 26, which clasp the middle plate 5, as shown in Fig. 3, thereby binding the three elements 4 5 4 firmly together and insuring good contacts.

30 is a carbon brush bearing on the bushing 17 and pivoted in the casing-top on a transverse shaft 31.

32 is a spring which keeps the brush in position against the bushing 17.

33 is a detachable binding-post carried by the brush 30. The current is taken from the outer end of the brush in any convenient manner.

Any suitable kind of electrolyte and depolarizer may be used.

I have described the elements 4 5 4 as independent plates detachably connected at the top by the contact device 24; but it is obvious that they could be made in one piece, as in Fig. 5, and be connected by bars 34, so as to be moved together, and where I speak of a "fixed element" I mean it to cover all parts of like polarity relatively fixed. These plates are suitably cut away, as in Fig. 2, so that the top 2, carrying the hangers, can be easily inserted and removed. The top 2 is adapted to rest on the bottom 1; but under some circumstances it will be necessary to provide means for clamping the top and bottom so as to be rigid.

The shaft 14, the hangers 11, and the screws 20 are preferably of non-metallic material, so that there is no metal but the element in the solution.

It is an important feature of my invention that I have devised a construction whereby I am enabled to take the current from the movable carbon element by means of a carbon brush, so that the loss of current in making contact from the movable element to the brush is reduced to a minimum, and I intend to claim this feature broadly. So far as I am aware this has not heretofore been done in this type of battery, but it has been necessary to provide mercury-cups and other inefficient and costly devices.

Having thus described my invention, I declare that what I claim as new, and desire to secure by Letters Patent, is—

1. In a battery, the combination with a fixed element and a movable carbon element, of a carbon brush bearing on a portion of said movable element, substantially as described.

2. In a battery, the combination with a fixed element and a movable carbon element of a pivoted carbon brush bearing on a portion of said movable element, substantially as described.

3. In a battery, the combination with a fixed element and a movable carbon element of a pivoted carbon brush bearing on a portion of said movable element and a spring holding the brush in contact with the movable element, substantially as described.

4. In a battery, the combination with a fixed element and a movable carbon element having a cylindrical portion, of a carbon brush bearing on the cylindrical portion and means for pressing the brush against the cylindrical portion, substantially as described.

5. In a battery, a two-part casing, one part containing the electrolyte and a fixed element, the other part being detachable and carrying a movable carbon element and a carbon brush contacting therewith, substantially as described.

6. In a battery, a two-part casing, one part containing the electrolyte and a fixed element, the other part being detachable and carrying a movable carbon element having a contact portion, a carbon brush and means for pressing the brush against the contact portion of said carbon element, substantially as described.

7. In a battery, a two-part casing, one part containing the electrolyte and a fixed element, the other part conforming thereto and being detachable, said part carrying hangers, a movable carbon element carried by said hangers having a contact portion and gear-teeth, a gear-wheel in said second part meshing with the teeth of the carbon element, a brush carried on said second part contacting with the carbon element, and means for rotating the gear-wheel, substantially as described.

8. In a battery, a rotatable element comprising two disks, a gear-ring between said disks having projecting teeth, and means for clamping the disks together, substantially as described.

9. In a battery, a rotatable element comprising two parallel disks connected by a hub portion a gear-ring having projecting teeth, a separable disk and means for clamping it and the gear-ring to one of said first-named disks, substantially as described.

10. In a battery, a rotatable element comprising two carbon disks, a gear-ring composed of hard rubber between said disks and having projecting teeth and means for clamping the disks together, substantially as described.

11. In a battery, the combination with an electrolyte, of a top carrying a collecting-brush and two sets of bearings, one set carried in hangers depending from the top and carrying a movable element, the other set carrying a driving-shaft, and connections between said driving-shaft and said element, substantially as described.

12. In a battery, the combination with a receptacle and an electrolyte, of a top carrying two sets of bearings and a collecting-brush, one set depending from the top and carrying a movable element, the other set carrying a driving-shaft, and connections between said driving-shaft and said element, and between said brush and said element, substantially as described.

13. In a battery, the combination with a receptacle, a fixed element and a movable element, of a separable top carrying bearings and a collecting-brush, a shaft in said bearings, and driving connections between said shaft and said element, said brush contacting with said element, substantially as described.

14. In a battery, the combination with a fixed element, of a movable element having a carbon contact portion, and a carbon brush bearing on said carbon contact portion of the movable element, substantially as described.

15. In a battery, the combination with a receptacle and an electrolyte, of a top carrying two sets of bearings, and a carbon brush, one set of bearings depending from the top and carrying a movable element, said element having a carbon contact portion engaged by said carbon brush, the other set carrying a driving-shaft, and connections between said driving-shaft and said element, substantially as described.

16. In a battery, the combination with a fixed element, of a top, and a movable carbon element carried in non-metallic hangers depending from said top, substantially as described.

17. In a battery, the combination with a movable element, of a carbon collecting-brush, substantially as described.

18. In a battery, the combination with a movable element having a bearing portion, of a carbon collecting-brush and means holding it in engagement with the bearing portion of the movable element, substantially as described.

19. In a battery, the combination with a receptacle, of a top carrying a movable element and a collecting-brush bearing thereon, substantially as described.

20. In a battery, the combination with a receptacle, of a top carrying a movable element and a collecting-brush of like material bearing thereon, substantially as described.

In testimony whereof I affix my signature in presence of two witnesses.

HENRY HALSEY.

Witnesses:
ISAREL HALSEY,
ELIZABETH MCFARLAN.